Patented Sept. 18, 1945

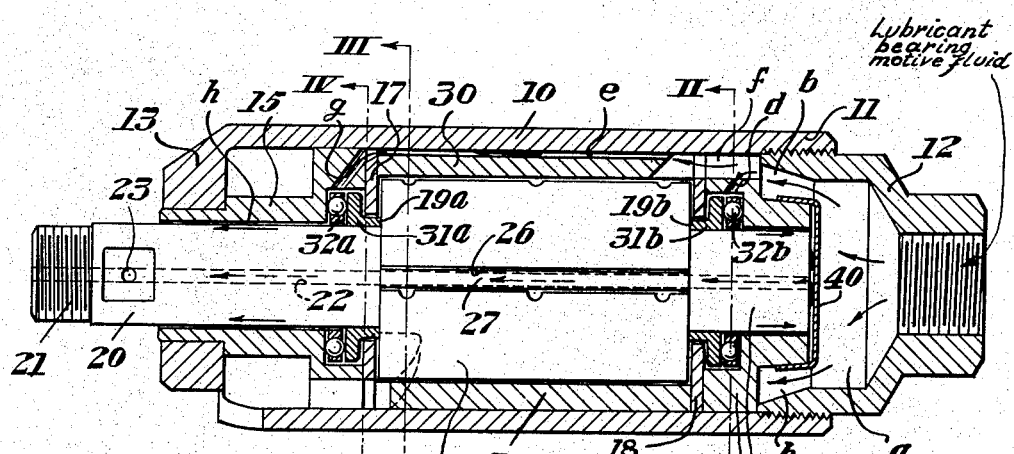
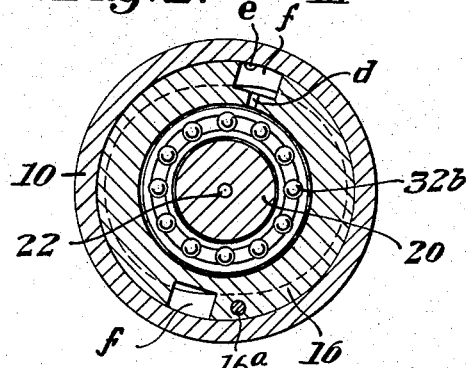
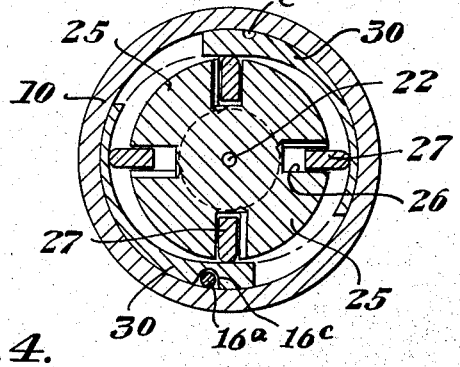
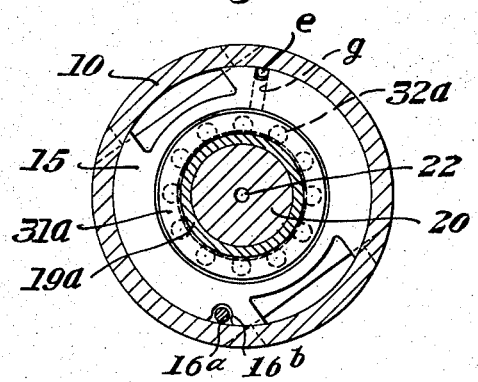

2,384,872

UNITED STATES PATENT OFFICE 2,384,872

TUBE CLEANER MOTOR

Virgil H. Baker and Paul T. Keebler, Springfield, Ohio, assignors to Elliott Company, Pittsburgh, Pa., a corporation of Pennsylvania Application July 9, 1942, Serial No. 450,326

7 Claims. (Cl. 121—34)

This invention pertains to a new and improved form of fluid motor, preferably a gaseous fluid motor for actuating tube cutting and cleaning tools for removing coke and other encrustations in tubing.

A motor of the type in question is subjected to a terrific beating and to heavy shock loads on its operating parts, and particularly upon its bearing parts. As a result, it has heretofore been impossible to attain a satisfactory and practical utilization of anti-friction bearings such as ball bearings.

We have found that a motor driving the simplest type of cutter head is obliged to transmit considerable thrust as exerted by the operator upon the hose which, in turn, is transmitted through the motor to the cutting head to advance it as desired. This is true to a certain extent whether the head is of a self-feeding type or not. That is, the operator is oftentimes obliged to pull in order to retard the advancement of the head if the encrustation is light or to push to aid the advancement of the head if the encrustation is heavy or hard.

In the conventional motors previously built, the thrust load has been taken upon what is known as the front or rear plates which are plain steel bearings. We have determined that a waste of as much as 20% of the limited available motor horsepower is lost in friction on these bearings. It has also been possible to practically stall the motor with excess of thrust due to the unsuitable nature of such friction surfaces.

As will be appreciated from the above brief description, the problem in the art has been to provide some type of bearing arrangement that will overcome the disadvantageous features of known bearing arrangements as previously used and will increase the effective motor horsepower for utilization in the actual cutting operation.

In view of this, it has been an object of our invention to provide a new and improved form of bearing arrangement for a motor of such a type.

Another object of our invention has been to provide an improved combination bearing arrangement for a motor of a tool such as a cutting tool that is particularly suitable for cleaning tubular encrustations in the inside of tubes such as employed in boilers, stills, etc.

A further object of our invention has been to solve the problem previously presented in the art in question as to bearing arrangements and to provide a new combination arrangement that will utilize the advantageous features of the bearing parts thereof without the previously inherent disadvantageous features.

A still further object has been to discover the causes and factors previously limiting bearing utilizations in the art in question and to provide a practical arrangement for meeting such problems and obtaining an improved result.

These and many other objects of our invention will appear to those skilled in the art from the drawing, the specification, and the claims.

After considerable experiment, we found that desired anto-friction types of bearings such as ball or roller have heretofore had no practical application in the art in question due to the shock load and also due to the fact that it has been impossible to suitably and adequately lubricate them. Further work along such lines disclosed that a correct minimum of lubrication was essential and that excessive lubrication produced results as undesirable as those obtained from too little lubrication. A small continuous amount of lubrication is an important phase of the present invention. That is, we found that excessive lubrication produces churning particularly where anti-friction members develop so much frictional heat in their rotation as to damage the bearings. Our idea has been to provide lubrication in an air-borne stream in correct minimum amount without storing or providing any surplus that will produce churning. Of course, as will be appreciated, too little lubrication produces excessive and destructive vibration within a bearing irrespective of whether any vibration is imposed externally. Our experience generally is that when minimum lubrication is supplied, additional lubrication has no effect upon vibration. However, vibration may be an added result following from improper lubrication. Accordingly, the method of lubricating any anti-friction bearing is particularly significant in connection with shock loads.

In utilizing our discoveries in this connection, we arranged to meet the problem involved by installing thrust bearings of an anti-friction type to take the rotatory thrust load; such bearings to be installed in such a manner that they would not participate in any of the journal load exerted in a radial direction. In other words, the purpose has been to provide a free-floating thrust bearing as far as the radial load is concerned.

The present invention may be utilized in connection with any suitable type of cleaner motor and the motor shown in the drawing is illustrative. Based on our discoveries, a new and improved utilization in combination of journal and anti-friction thrust bearings has been effected;

and, we have been able to obtain new and improved results in the art. Our discoveries in connection with lubrication are also of importance.

In the drawing:

Fig. 1 is a longitudinal section of our rotary motor.

Figs. 2, 3 and 4 are sections taken on line II—II, III—III and IV—IV, respectively, of Fig. 1.

Referring particularly to Figure 1 of the drawing, the motor comprises an outer protective shell or housing 10 terminating at its rear end in a threaded portion 11 within which fits a conventional form of coupling portion 12. The latter is suitably threaded in a conventional manner to receive an energizing fluid (air) connection (not shown). The front portion of the shell 10 terminates in a portion 13 resting on a front sleeve-like radial thrust bearing 15.

It will be noted that inner motor-blade-guiding spirally continuous cam segments 30 fit within inner walls of the portion 10. A rotor shaft 20 has a front threaded tip or stud 21 upon which any suitable cutting tool may be mounted in the usual manner. A rotor body portion 25 of larger diameter is mounted substantially centrally of the shell 10 and is provided with radial slots 26 within which suitable slidable rotor blades or paddles 27 are operably positioned. A rear portion 24 of the rotor is covered by a snap-on pressed steel cap 40 and is supported within a rear sleeve-like radial thrust bearing 16. Front and rear plate portions 17 and 18, respectively, cooperate with angle of L shaped thrust washer portions 19a and 19b, respectively, to operably position roller bearing races 32a and 32b.

As shown, front and rear plates 17 and 18 preferably have a non-rotatable slip-fit in the shell 10, and are doweled to the bearings 15 and 16 and to the cam segments 30; they are thus locked in position between end portions of the rotor body, make no contact with ball thrust retainers, front or rear, and have no chance to participate in the rotation of the rotor body 25. The members 15 and 16 each carry a dowel pin 16a as shown, for example, in Figure 2, which extends in an axial direction, and which passes through an opening 16b in the end bearing plate 17 or 18, as the case may be. This dowel pin enters a suitable groove 16c, as shown in Figure 3, provided in the periphery of the sleeve 30. Proper registration of the sleeve 30, the bearing disks 17 and 18, and the bearings 15 and 16, is thus secured, and when the parts are assembled and the coupling member 12 is screwed in, all of these parts are held from rotation in the shell. It will also be noted that plates 17 and 18 make no contact with ball thrust retainers, front and rear. The ball races are preferably flat, polished surfaces of case-hardened steel—consequently, they have no ability to take radial load.

The end plates 17 and 18 are preferably mounted to constantly abut the cylinder 25 at each end thereof; their surfaces are separated by a distance determined by the length of the cylinder. The blades 27 are also preferably of the same length as the cylinder minus .001 to .002 for operating clearance; it will be apparent that end leakage depends upon this operating clearance. Accordingly, there is a definite inter-relationship between the length of the cylinder 25 and the length of the blades 27 that regulates end clearances and leakage and that is in accordance with our invention made independent of any effects produced upon the motor by external thrust loads.

The thrust load is, in effect, divided into rotor (paddle) blade thrust and load thrust; the rotor thrust is taken by plates 17 and 18 and the load thrust is carried axially past the plates 17 and 18 (point of paddle thrust) by rotating washers 19a and b to anti-friction thrust bearings 32a and b. The radial load is taken by sleeve-like portions 15 and 16; the radial float in the anti-friction thrust bearings 32a and b enables them to be entirely free from radial journal load; the raceway is designed to insure this result. Thus, as will appear from the above, the thrust load is divided into two parts, one, namely, the restraining of the freely-floating blades, and the other, the load imposed by the working tool, itself.

As shown by the arrows, the operating fluid containing a suitable lubricant such as oil enters the motor through the coupling portion 12, past the chamber a and in through chamber b into chamber f. A portion of it is diverted through port d, passages e and g about rear and front anti-friction bearings and the associated parts 31a and 31b, 17 and 18, and between the inner portions of the front and rear radial bearing members 15 and 16. The leakage of air is thus radially inward, in the case of the rear bearings, along the inside of cap 40, into a central axial passageway 22; in the case of the front bearings, to radial passage h. The passage 22 exhausts through the front end of stud 21 and through a radial portion 23; the passage h exhausts between the front sleeve bearing portion 15 and the outer surface of rotor shaft 20.

A motor of the type such as shown for the purpose of illustration has been successfully operated with 150 cubic feet of free air per minute, utilizing approximately 1 quart of oil per hour. It would seem from the nature of the service that the lubrication is generous, but actually upon calculation of the amount of oil vaporized in a cubic foot of air, it will be found that the quantity is too small to give very effective lubrication. It is thus necessary to get a higher concentration of oil, but it is impossible and too costly to raise the concentration of the oil in the air supply by merely adding an additional quantity of oil. In accordance with our discoveries, proper lubrication is effected by having the air strike bearing surfaces in such a manner that an oil fog will precipitate out; that is, the application is in such a manner that when the fluid mixture or fog strikes the bearing surface or surfaces, air rebounds and scrubs off quickly due to its low viscosity and high fluidity, whereas oil, the more viscous, denser fluid, sticks.

With the arrangement of the present invention the bearings are not merely in an atmosphere of air with oil in suspension, but air carrying oil is actually diverted from the main stream of fluid at the intake end of the motor, and circulated through the bearings in a manner such as to insure adequate lubrication, even with a small concentration of oil in the air.

From the above description, it will be apparent that we provide a thin or very light supply of lubricating medium through the agency of the operating gaseous fluid to suitably lubricate the bearings in the manner contemplated; the bearing parts are kept washed clean by a continuous replacement of the lubricating fluid. The means of supplying oil to air for the operation of pneumatic machinery is well known in the art and forms no part per se of the present invention, any usual or preferred means for this purpose being used.

It will also be noted that the front and rear thrust plates 17 and 18 are bored to a larger diameter adjacent to the thrust washers 19a and b in order to enable them to clear the latter. Such plates now take no thrust from the rotor, itself. The paddles 27 in the motor being merely slidably fixed in the slots 26 are held in place by the perimeter of the cam 30. There is no restriction against end play of the paddles and consequently they, themselves, exert enough thrust at random on both the front and rear plates to require a suitable wearing surface. In the present arrangement as evolved on the basis of our discoveries, the front and rear plates 17 and 18 take the end wear of the paddles to the extent necessary to maintain them in suitable operating position.

Since the operating air pushing the paddles leaks around either end of the rotor between the rear plate and the rotor radially inwardly or between the rotor and the front plate, the precise adjustment of end clearance is important. There must be enough end play allowance to allow the anti-friction bearings to take thrust, but not too much allowance to produce excessive leakage. If such bearings fail, the front and rear plates assume their usual function of taking thrust from both the rotor and the paddle. Thus it will be apparent that the sleeve bearing portions 15 and 16 take care of the radial load and the thrust bearing of an anti-friction type takes care of the axial load.

In accordance with our invention, paddle thrust and the load thrust are suitably divided, and radial thrust is carried axially between such thrust loads. Paddle thrust is taken directly upon a stationary member by transmitting rotor thrust to a rotating member that, in turn, communicates to a thrust bearing. End leakage between rear and front bearing plates in the rotor takes the lubrication past the bearings; a slight film or mist suspension of oil may be introduced in the gaseous medium to scrub across bearing surfaces that are being continuously and simultaneously cooled (vented) and lubricated. The arrangement makes possible a minimum supply of oil for maximum efficiency of operation and a minimum of vibration.

The arrangement is based upon the utilization of a current of air carrying moisture or oil in the form of a mist suspension to, in effect, scrub across the surfaces without producing an objectionable accumulation of oil on such surfaces. Since the supply of air or gaseous fluid is continuous, it is apparent that the supply of lubrication is continuous and that undesired surplus accumulation is prevented.

It is believed that the present invention meets problems set forth by such an apparatus arrangement as shown, for example, in the Young Patent No. 1,933,000.

Although for the purposes of illustrating our invention, we have shown a partcular type of motor and a particular arrangement of apparatus, it will be apparent to those skilled in the art that the problem solved by the present invention is one of long standing and may be applied to other suitable apparatus arrangements. It will also be apparent that many substitutions, additions, subtractions, and modifications may be made in the apparatus disclosed and described without departing from the spirit and scope of the invention as indicated in the appended claims.

We claim:

1. In a fluid pressure motor of the class described, a shell, a rotor with radially movable vanes in the shell having a shaft portion at each end thereof, means in the shell at each end thereof providing a journal bearing element for each of said shaft portions, means in each journal bearing element providing a thrust bearing incapable of resisting pressure in a radial direction at each end of the rotor while receiving longitudinally directed thrust imparted to the rotor through a load driven thereby, a bearing plate at each end of the rotor confined by the journal bearing elements and out of contact with said radially movable thrust bearing means, said bearing plates providing a thrust bearing for the vanes, means for supplying operating lubricant-bearing fluid to one end of the shell, and restricted passages for conducting a part of the entering lubricant-bearing operating fluid directly to the said radially movable thrust bearings for the rotor.

2. A fluid pressure motor of the class described comprising a shell with a cylindrical chamber therein, means providing an end structure at one end of the shell, a rotor in the shell having radially movable vanes thereon and having a shaft portion at each end thereof, a bearing member in each end of the shell having an enlarged portion for centering it in the cylindrical chamber and a sleeve portion providing journal bearings for the shaft portions of the rotor, a sleeve element in the shell surrounding the rotor having cam-like surfaces on its interior for cooperation with the vanes of the rotor, said sleeve element being confined between the bearing members, each of said bearing members having a well therein on the end thereof nearest the rotor, means providing an anti-friction thrust bearing in each well, said means being incapable of resisting pressure in a radial direction, a thrust collar on the shaft between each anti-friction thrust bearing and the rotor, said collar engaging the end face of the rotor and engaging one of the anti-friction bearings, and a bearing plate at each end of the rotor around each thrust collar and confined between the bearing members and said sleeve element, said bearing plates providing a bearing surface for the ends of the vanes of the rotor and serving to close the space between the ends of the rotor and the bearing members.

3. A fluid pressure motor of the class described comprising a shell with a cylindrical chamber therein, means providing an end structure at one end of the shell, a rotor in the shell having radially movable vanes thereon and having a shaft portion at each end thereof, a bearing member in each end of the shell having an enlarged portion for centering it in the cylindrical chamber and a sleeve portion providing journal bearings for the shaft portions of the rotor, a sleeve element in the shell surrounding the rotor having cam-like surfaces on its interior for cooperation with the vanes of the rotor, said sleeve element being confined between the bearing members, each of said bearing members having a well therein on the end thereof nearest the rotor, a radially free anti-friction thrust bearing in each well, a thrust collar on the shaft between each anti-friction thrust bearing and the rotor, said collar engaging the end face of the rotor and engaging one of the anti-friction bearings, and a bearing plate at each end of the rotor around each thrust collar and confined between the bearing members and said sleeve element, said bearing plates providing a bearing surface for the ends of the vanes of the rotor and serving to close the space between the ends of the rotor and the bearing members, the bearing member at that end of the shell having an end structure abutting against the said end structure, and means providing a union for connecting the motor to a source of fluid supply threaded into the other end of the shell and engaging the other bearing member, whereby the parts are confined by said union against endwise movement in the shell.

4. A fluid pressure motor of the class described comprising a shell with a cylindrical chamber therein, means providing an end structure at one end of the shell, a rotor in the shell having radially movable vanes thereon and having a shaft portion at each end thereof, a bearing member in each end of the shell having an enlarged portion for centering it in the cylindrical chamber and a sleeve portion providing journal bearings for the shaft portions of the rotor, a sleeve element in the shell surrounding the rotor having cam-like surfaces on its interior for cooperation with the vanes of the rotor, said sleeve element being confined between the bearing members, each of said bearing members having a well therein on the end thereof nearest the rotor, means constituting a radially free anti-friction thrust bearing in each well, a thrust collar on the shaft between each anti-friction thrust bearing and the rotor, said collar engaging the end face of the rotor and engaging one of the anti-friction bearings, a bearing plate at each end of the rotor around each thrust collar and confined between the bearing members and said sleeve element, said bearing plates providing a bearing surface for the ends of the vanes of the rotor and serving to close the space between the ends of the rotor and the bearing members, the bearing member at that end of the shell having an end structure abutting against the said end structure, and means providing a union for connecting the motor to a source of fluid supply threaded into the other end of the shell and engaging the other bearing member, whereby the parts are confined by said union against endwise movement in the shell, said bearing plates being secured against rotation and having ports therethrough through which the operating fluid may pass, the shell having an opening for the escape of fluid through a part thereof providing the end structure of the shell.

5. A tube cleaner motor comprising a rotor having a shaft at each end thereof, a shell enclosing the rotor having air inlet means at one end and air outlet means at the other, means at each end of the rotor in the shell providing a sleeve bearing for the shaft at each end of the rotor, a bearing plate at each end of the rotor clear of the shaft and located between the rotor and sleeve bearings, each of said sleeve bearings having a recess therein on the end thereof nearest the rotor, a thrust collar surrounding the shaft at each end of the rotor, each of said thrust collars passing through the bearing plate at the end of the rotor adjacent which it is located, and anti-friction thrust bearing means in each recess engaged by said collar, whereby end thrust on the rotor is partly assumed by the bearing plates and partly by the anti-friction bearings.

6. A tube cleaner motor comprising the combination with a housing of a rotor mounted in the housing, shaft members extending forwardly and rearwardly from the rotor, radial thrust bearing instrumentalities for the shaft members, anti-friction bearings for the shaft members mounted in the radial thrust bearing instrumentalities and adapted to receive axial thrust of the said rotor and shaft members while the radial thrust bearing instrumentalities are adapted to receive radial thrust of the rotor during operation thereof, instrumentalities on the shaft members for retaining the anti-friction bearings in place, operating instrumentalities for the rotor for driving the rotor under action of compressed air, coupling means connecting the housing to a supply of compressed air, means for admitting compressed air from the coupling means into the anti-friction bearings, whereby the said bearings may be lubricated by lubricant entrained in the said compressed air, a thrust collar on each shaft member for retaining the anti-friction bearings in position, bearing plates at each end of the rotor fixedly mounted in the housing and partially enclosing the anti-friction bearings, the said bearing plates and anti-friction bearings being adapted to take axial thrust of the rotor during its operation, operating instrumentalities in the rotor for operating the rotor under pressure of the compressed air, and an outlet passage for the air extending through the shaft members and the rotor, the radial thrust bearing instrumentalities being adapted to receive all radial thrust from the rotor and shaft members.

7. A fluid pressure motor of the class described comprising a cylindrical shell, a rotor with a plurality of radially movable vanes in the shell, means in the shell providing eccentric surfaces against which the edges of the vanes engage, the rotor having an axially extending shaft portion at each end thereof, a bearing plate at each end of the rotor spaced from the axially extending shaft portions of the rotor providing a thrust surface for the ends of the vanes of the rotor, end members beyond each bearing plate providing a radial bearing for the said shaft portion at each end of the rotor, a collar on the shaft portion at each end of the rotor, said collar passing through the space between the bearing plate and the shaft so as to bear against the end of the rotor and be free to turn in the bearing plate, and an anti-friction bearing means between said collar at each end of the rotor and said end members whereby working end-thrust on the rotor is transmitted through said collar to the anti-friction bearings and through such bearings to the end members, there being a chamber provided between the respective bearing plates and their end members to receive the anti-friction bearing, the chamber being of greater internal diameter than the anti-friction bearing whereby the anti-friction bearing may not transmit radial thrust, and means providing air passages through the end members and bearing plates for the flow of operating fluid endwise into and out of the shell.

VIRGIL H. BAKER.
PAUL T. KEEBLER.